(12) United States Patent
Baker et al.

(10) Patent No.: US 11,924,583 B2
(45) Date of Patent: Mar. 5, 2024

(54) MOBILARM

(71) Applicants: Ronald Baker, Alpharetta, GA (US);
Angela Baker, Alpharetta, GA (US)

(72) Inventors: Ronald Baker, Alpharetta, GA (US);
Angela Baker, Alpharetta, GA (US)

( * ) Notice: Subject to any disclaimer, the term of this patent is extended or adjusted under 35 U.S.C. 154(b) by 0 days.

(21) Appl. No.: 17/151,353

(22) Filed: Jan. 18, 2021

(65) Prior Publication Data

US 2021/0227179 A1 Jul. 22, 2021

Related U.S. Application Data

(60) Provisional application No. 62/963,378, filed on Jan. 20, 2020.

(51) Int. Cl.
| | |
|---|---|
| *H04N 7/18* | (2006.01) |
| *G06V 40/16* | (2022.01) |
| *G08B 13/00* | (2006.01) |
| *H04N 23/90* | (2023.01) |
| *H04W 4/30* | (2018.01) |

(52) U.S. Cl.
CPC ............. *H04N 7/18* (2013.01); *G06V 40/172* (2022.01); *G08B 13/00* (2013.01); *H04N 23/90* (2023.01); *H04W 4/30* (2018.02)

(58) Field of Classification Search
CPC ........ H04N 7/18; H04N 5/247; G06V 40/172; G08B 13/00; H04W 4/30
USPC ....................................................... 340/541
See application file for complete search history.

(56) References Cited

U.S. PATENT DOCUMENTS

| | | | | |
|---|---|---|---|---|
| 9,325,366 | B1* | 4/2016 | Zhou | H04M 1/04 |
| 9,531,423 | B2* | 12/2016 | Gordon | H04B 1/3888 |
| 9,728,077 | B1* | 8/2017 | Fu | G08B 27/003 |
| 9,975,483 | B1* | 5/2018 | Ramaswamy | B60Q 11/00 |
| 9,985,678 | B1* | 5/2018 | Sumida | H04B 1/3888 |
| 10,762,769 | B1* | 9/2020 | Sommerlatt | G08B 25/12 |
| 2010/0157061 | A1* | 6/2010 | Katsman | G07C 5/008 |
| | | | | 348/149 |
| 2011/0169625 | A1* | 7/2011 | James | B60W 30/095 |
| | | | | 340/439 |
| 2012/0034901 | A1* | 2/2012 | Xiao | H04M 1/67 |
| | | | | 455/411 |
| 2014/0184801 | A1* | 7/2014 | Choi | G06V 10/25 |
| | | | | 348/158 |
| 2015/0124067 | A1* | 5/2015 | Bala | A61B 5/0803 |
| | | | | 348/77 |

(Continued)

*Primary Examiner* — Zhen Y Wu
(74) *Attorney, Agent, or Firm* — Ronald D. Baker; BAKER & Co. PATENT LAW (57) ABSTRACT

An embodiment for alerting emergency contacts includes a portable device and data collecting computer comprising a processor and software. The processor is configured to connect to a communication system; submit data to a contact; and receive data from mobile devices. The mobile devices transmit data. If the data collecting computer receives distress data from the mobile device, the data collecting computer communicates to a first communication device. The processor is configured to communicate, via the communication system, to a first communication device; and submit data to the first communication device. The processor is configured to capture images of an intruder by utilizing artificial intelligence when prompted by the user. The artificial intelligence uses facial recognition to recognize face of the intruder.

8 Claims, 7 Drawing Sheets

(56) References Cited

U.S. PATENT DOCUMENTS

| | | | |
|---|---|---|---|
| 2016/0012713 A1* | 1/2016 | Siwak | G08B 25/10 |
| | | | 340/541 |
| 2016/0098138 A1* | 4/2016 | Park | G06F 3/04886 |
| | | | 345/173 |
| 2016/0112636 A1* | 4/2016 | Yamaguchi | H04N 23/667 |
| | | | 348/158 |
| 2016/0280131 A1* | 9/2016 | Carson, Jr. | G07C 5/0866 |
| 2017/0092111 A1* | 3/2017 | Hou | G08B 7/06 |
| 2018/0013463 A1* | 1/2018 | Jeon | H04M 1/04 |
| 2018/0099622 A1* | 4/2018 | Richardson | B60R 11/0241 |
| 2018/0268674 A1* | 9/2018 | Siminoff | H04N 7/186 |
| 2018/0295271 A1* | 10/2018 | Kim | H04N 23/695 |
| 2019/0027005 A1* | 1/2019 | Siwak | G08B 13/19695 |
| 2019/0147721 A1* | 5/2019 | Avitan | G06F 1/3209 |
| | | | 340/573.1 |
| 2019/0350398 A1* | 11/2019 | Raphael | A47G 29/141 |
| 2020/0082679 A1* | 3/2020 | Scalisi | G08B 7/064 |
| 2020/0099413 A1* | 3/2020 | Kim | A45C 11/00 |
| 2020/0184738 A1* | 6/2020 | Ngo | H04W 4/90 |
| 2020/0410843 A1* | 12/2020 | Law | G08B 21/0446 |
| 2021/0106106 A1* | 4/2021 | Reyes | F16M 13/022 |
| 2021/0233382 A1* | 7/2021 | Allen | G08B 21/02 |
| 2022/0217308 A1* | 7/2022 | Mont-Reynaud | H04N 23/611 |

* cited by examiner

MOBILARM

CROSS-REFERENCE TO RELATED APPLICATIONS

The present application claims priority to the earlier filed provisional application having U.S. Ser. No. 62/963,378, and hereby incorporates subject matter of the provisional application in its entirety.

BACKGROUND OF THE INVENTION

Field of the Art

The disclosure relates to a device and system for assisting a user with providing security services while traveling. The invention will further provide a user with a novel and unique way of being alerted to an intruder.

Discussion of the State of the Art

More than ever crime has greatly increased across the United States and has resulted in people looking for ways of protecting their families.

Most states have seen violent crimes increase by 4% and made most people fearful about leaving their homes not to mention traveling. In early 2012 a family left their young daughter in a hotel room while on vacation and upon returning their young daughter was abducted. In 2016 while on a business trip an executive returned to her hotel and was attacked and raped by a male who entered her room while she was asleep.

Crime reporting agencies have reported that violent crimes have increased significantly thus causing the public to wonder what is going on.

As it stands most families travel without much security while staying at resorts or hotels which raises the risk of attacks on unsuspecting citizens while at temporary lodging such as hotels and campsites.

Further, though families are experiencing a significant amount of wealth and prosperity, people are otherwise concerned about their safety. News across America is filled with terror attacks, school shootings, robberies, young girls being forced into prostitution, and not to mention home invasions. Additionally, as student enrollment has greatly increased, it is becoming more important to ensure that students are protected as much as possible as a record number of crimes have also increased on college campuses. Parents will feel a sense of relief if their child was able to utilize the present embodiment in their dorm rooms or apartments while away from home studying.

Accordingly, what is needed in the art is a portable security device that can be transported by a user while conducting personal or business matters. What is further needed in the art is a device that can be transported to various locations with the intent of providing surveillance services. What is further needed in the art is a reliable system of recording events and images with the purpose of transmitting data for security purposes.

SUMMARY OF THE INVENTION

Accordingly, the inventor has conceived, in a preferred embodiment of the invention, an embodiment for providing portable security while staying at temporary lodging such as hotels.

According to a preferred embodiment of the invention, an embodiment with a method to affix in a removable fashion to various entry points to provide a practical way of recording video footage, sending alerts to designated contacts, and transmitting other information in the event of an intrusion. The embodiment comprises a portable device that can easily attach to an entry point that is designed with a software application and other monitoring features for sending alerts in a manner intended to save lives. The portable device can be attached along the top of an existing door in a manner by applying the embodiment by utilizing a hanger that affix to the door for monitoring both external movement in areas such as hallways as well as internal movement in areas such as interior guest rooms. Furthermore, in a non-limiting manner, even when the device is charging on a night stand in the room it can still monitor any movement throughout the room. Further according to the embodiment, the portable device will include a compact design that allows a user to transport the embodiment while traveling. As an optional embodiment, the Mobilarm™ can be designed to be durable and waterproof in the event the apparatus is accidentally submerged in water.

BRIEF DESCRIPTION OF THE DRAWING FIGURES

The accompanying drawings illustrate several embodiments of the invention and together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way. Certain illustrative embodiments illustrating organization and method of operation, together with objects and advantages may be best understood by reference detailed description that follows taken in conjunction with the accompanying drawings in which:

DETAILED DESCRIPTION

The inventor has conceived, a portable device and system useful for providing security for users during travel and while at home. The embodiment will transmit critical information to third parties.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

A description of an embodiment with several components in connection with each other does not imply that all such components are required. To the contrary, a variety of optional components may be described to illustrate a wide variety of possible embodiments of one or more of the inventions and in order to more fully illustrate one or more aspects of the inventions.

Mechanisms described or referenced herein will sometimes be described in singular form for clarity. However, it should be appreciated that particular embodiments may include multiple instantiations of a mechanism unless noted otherwise. Blocks in figures should may, in some embodiments be understood as representing segments or portions of those embodiments. Alternate implementations are included within the scope of embodiments of the present invention would be understood by those having ordinary skill in the art.

Definitions

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a mobile device refers to a variety of components that operates using any means of internet connection or similar modem that transmits packets of data that allow smart devices (such as phones, tablets, computers, handheld devices, game devices, etc.) to be updated when they receive data regarding the interior condition of a vehicle. The ability of a mobile device to collect such data packets based on the vehicle's interior environment is important when compiling critical information in order to relay to the user.

Reference throughout this document to a sensor refers to a variety of components that operates using any means of technology to detect the presence of an object. The term object may incorporate any obstruction or sizeable matter and is not limited to humans or animals. The ability of a sensor to detect such object is important to relay critical information to the user.

Figure 6:
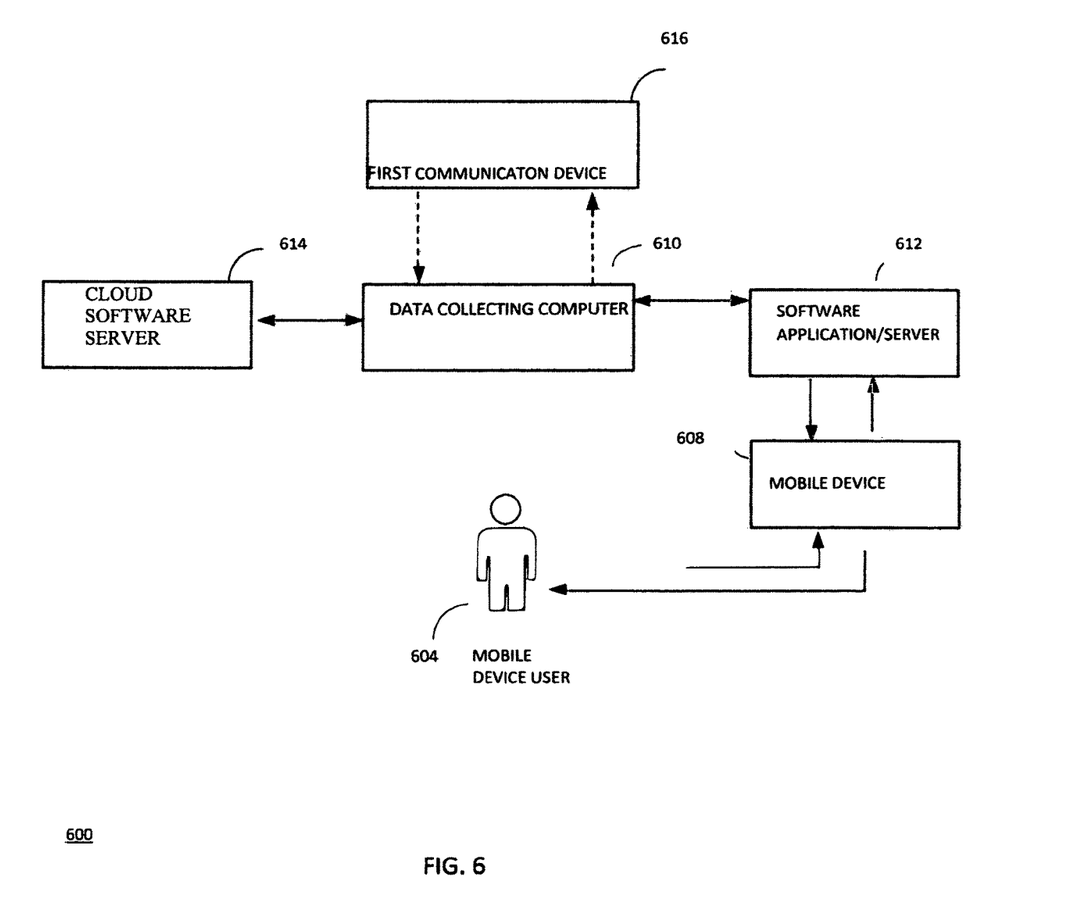
FIG. 6 is a system diagram for communicating with a mobile device consistent with certain embodiments of the present invention.

Mobilarm™ can utilize wireless communications and Bluetooth or similar technology that can be connected to devices such as Android tablets, but is not limited to these examples. The Mobilarm™ application may be adaptable to a variety of Bluetooth devices such as headsets or any medium useful for data submission. Additionally, Mobilarm™ can be conveniently placed or mounted to adjacent interior surfaces of a room to monitor for the presence of an uninvited occupant and communicate data directly to the user (604). Once connected to the mobile device or optional Bluetooth device, Mobilarm™ will remain in constant contact with such devices and will continuously transmit data at the user's preference. In a non-limiting example, users may initiate additional functions by manually alerting the software application installed on the mobile device. Connecting with the software application stored on a mobile device, or computer is a reliable method to ensure that all collected data associated to Mobilarm™ are stored and accessible for a user (604). Once the system is initiated the user (604) can be alerted via mobile device and all of the data in an instance will be transmitted to the user (604) once a security threat is detected. The data may be saved to a digital storage in a cloud-based service such as Amazon web service as an example. Any mobile device that the user (604) decides to configure will have the capability to collect data while the user is away from a designated area for other purposes that will make such information useful while the user is absent. In a non-limiting example, the software application installed on the mobile device (608) of an emergency contact may display an image of a map with the user's location to family members to indicate that the user (604) is in peril and to provide useful GPS information. Information is constantly compiled for each device through use of the software application on the desired mobile device. In a non-limiting example, it will be appreciated that Mobilarm™ may come standard with a anti hacking system that will allow users to defend against third party cyber threats.

Utilizing sensors (4) to detect when the door has been moved Mobilarm™ will immediately activate. To elaborate, once the portable device has been installed along the top edge of the door (9), the user (604) will simply turn on the device by using the on/off switch (15) along one-side of the device and the sensor (4) will cause a beam to make contact with the floor of the interior room. If for any reason the sensor (4) detects that the door has been moved then the device will activate and transmit emergency data to the user (604) and other critical contacts. Using data such as location information, the Mobilarm™ system provide highly accurate data for mobile device users to avoid a potential security risk. In a non-limiting example, a mobile device (608) will collect critical data from a front camera (1) which may simultaneously monitor the environment to report information to the user (604). In an exemplary embodiment, the use of mobile devices to receive data and be alerted to dangerous conditions in the event of security breach is a novel way to keep users safe. This will present an opportunity for a user to quickly respond to such circumstances by using a combination of a mobile device (608), sensors (4), and software application (612). The use of transmitted data to a user (604) during such circumstances is critical for capturing information through the integrated use of Mobilarm™, mobile device (608), and a data collecting computer (610) that stores critical data for the user.

In an exemplary embodiment, the characteristics of the mobile device and other user information associated with the mobile device (608) may be input manually by the user. The key factors of tracking and retrieving data manually will be left solely up to the user's preference. In a non-limiting example, the Mobilarm™ system may also automatically track sounds via the microphone (16) that can be transmitted directly to the mobile device (608) for the user (604). This method of collecting data involves the use of monitoring a room's interior conditions by use of the Mobilarm™ to assist the software application (612) to submit accurate data and maintain accurate records for emergency purposes. Furthermore, in a non-limiting example recorded audio data may be captured by the Mobilarm™ and utilized by law enforcement for instance.

In an exemplary embodiment, the user (604) may also edit a variety of information (e.g., time, identification of suspects, and locations). In a non-limiting example, the location feature allows users to share the specific location of the emergency to officials by sharing a map and name of locations for responders. The system can provide a report to show time and date of events for purposes such as court appearances, medical purposes, or insurance information where such information is critical.

The embodiment operates by allowing a user (604) to place the Mobilarm™ in a convenient location, ideally along the top edge of a door (9) or other convenient locations but is not limited to these examples. As a non-limiting example, once the embodiment is positioned and initiated via on/off switch (15), the user may leave the room and continue to monitor the room while away. In an exemplary embodiment, the Mobilarm™ system will detect the movement of an uninvited person within the room interior and immediately communicate to the user's mobile device (608) or local authorities such as police after the intruder has been detected. Alternatively, where the user (604) is present in the room and is either asleep or in another adjacent room, the Mobilarm™ can still monitor the area for intruders and immediately alert the user to the intrusion and send data to critical contacts. The user can program the Mobilarm™ system to contact one or more parties upon activation and will automatically activate upon detecting an intruder in close proximity and transmit data to emergency contacts after three minutes if no response occurs by the user. In an alternate embodiment, Mobilarm™ cannot be manually turned off beyond three minutes of activation, but rather it must be deactivated from the software application (612) downloaded to the user's mobile device (608). Further in a non-limiting example, the software application (612) may require a code to deactivate the alert after it has been initiated by an intruder. Additionally, the Mobilarm™ system will automatically send a silent alert to the mobile device no matter what mode the device is in. Furthermore, the Mobilarm™ system allows for a manual override via the software application (612) in the event there is no person found in the room after inspection. The Mobilarm™ can also come standard with (AI) facial recognition technology that is aimed at determining the identification of intruders. In a non-limiting example, the Mobilarm™ can be designed to be utilized on personal effects such as backpacks, private or military vehicles, and even on clothing but is not limited by these examples. It will be appreciated that Mobilarm™ can be applied in similar areas that will accommodate its size and geometry.

Exemplary Embodiments

Figure 1:
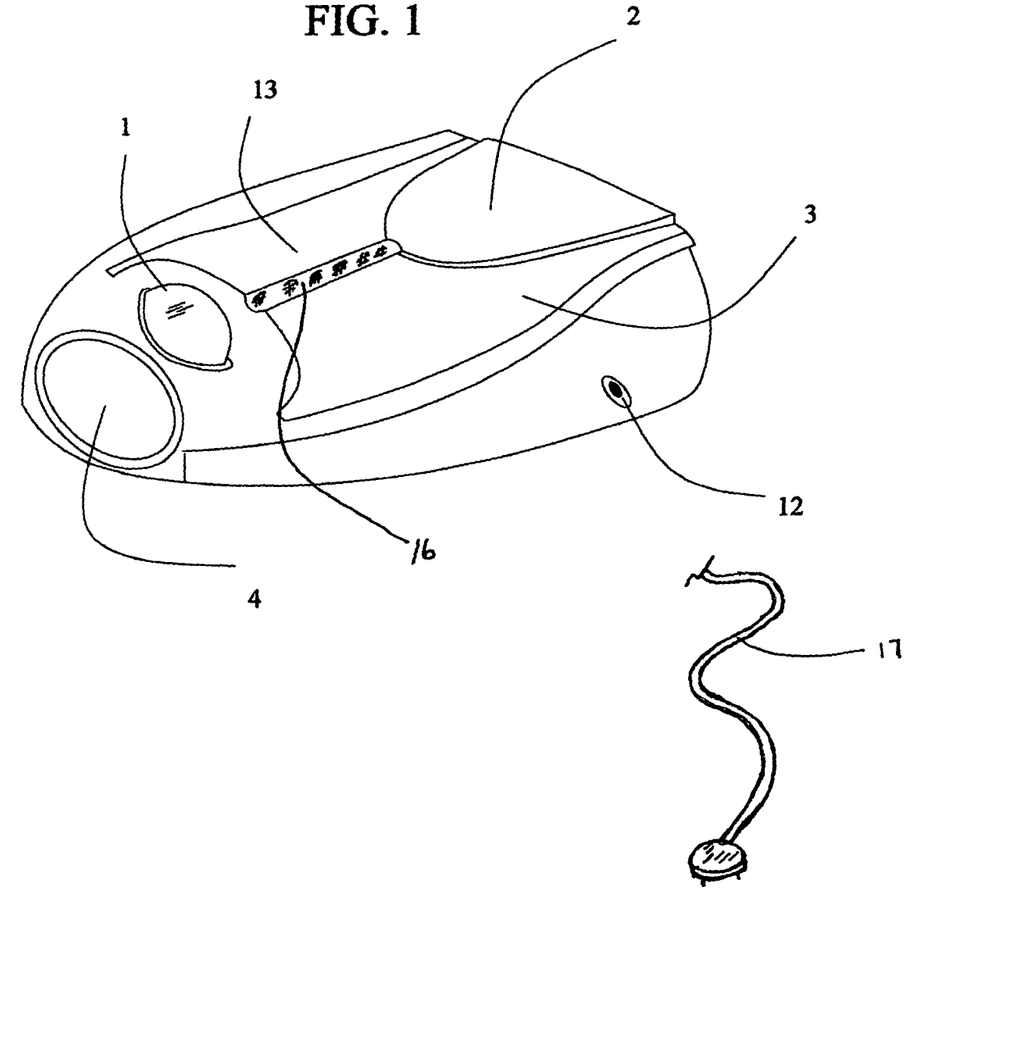
FIG. 1 is a perspective view of the portable device consistent with certain embodiments of the present invention.

FIG. 1 is a perspective view of the portable device consistent with certain embodiments of the present invention. The figure depicts the embodiment to include a front camera (1) designed along the front surface (13) of the embodiment. The embodiment also shows a microphone (16) along the front, a sensor (4) that senses any movement by the embodiment once installed along the top edge of a standard door. Additionally, the figure depicts a charging port (12) along the left-side surface of the embodiment for inserting a detachable charger (17) for the powering the portable device for use.

Figure 2:
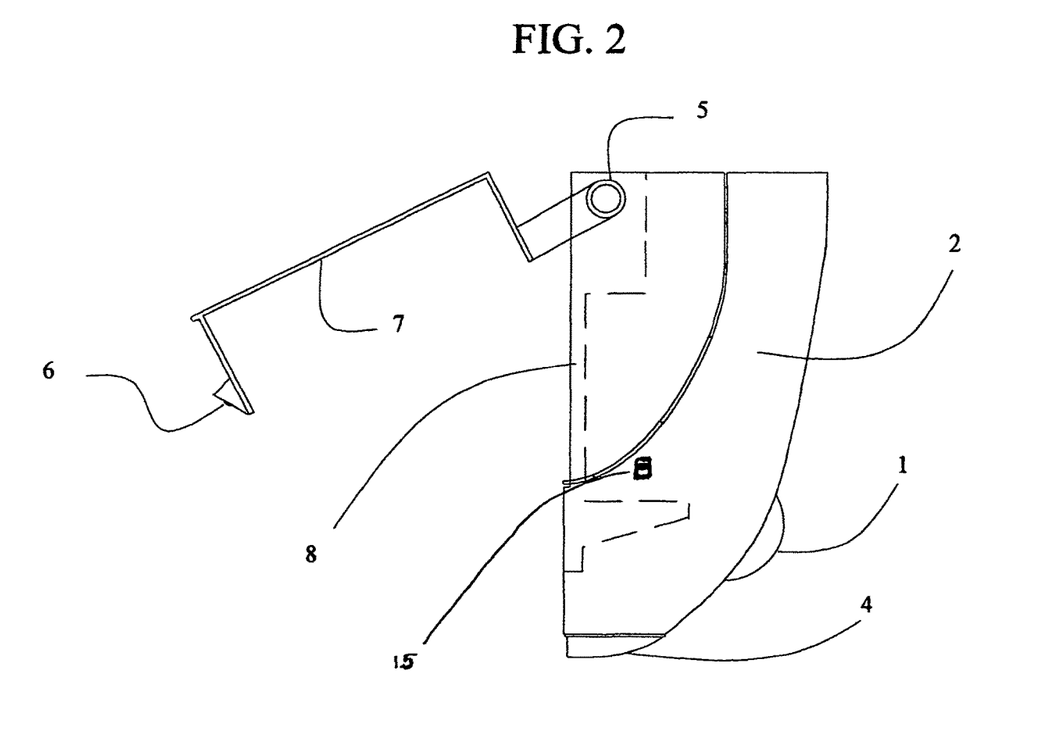
FIG. 2 is a perspective view of the hanger extending from the portable device with certain embodiments of the present invention.

FIG. 2 is a side-view of the portable device consistent with certain embodiments of the present invention. This figure depicts the hanger (7) being extended outward from a recessed area (8) that allows for a flush storage when the hanger (7) is retracted. The hanger (7) is designed with a rear camera (6) that allows the embodiment to record video data from an area that is located rear camera (6) that allows the embodiment to record video data from an area that is located outside of a room. The figure also shows a rotatable hinge (5) that allows for an extension of the hanger (7). The figure also shows the front camera (1), an on/off switch (15) that allows the user to manually activate or deactivate the Mobilarm™, and the sensor (4) that can determine if the Mobilarm™ has been moved based on the movement of the door (9) or any other objects that the Mobilarm™ may be attached.

Figure 3:
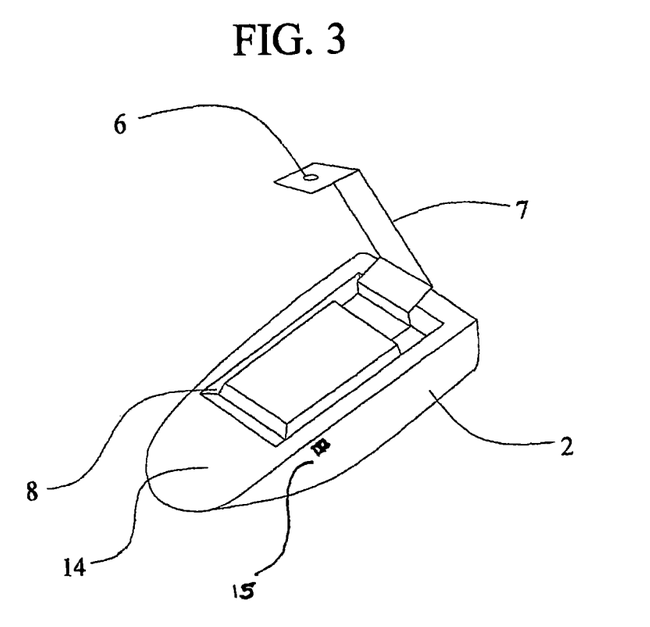
FIG. 3 is a perspective rear view of the portable device consistent with certain embodiments of the present invention.

FIG. 3 consists of a perspective rear-view of the Mobilarm™ for conveniently transmitting recorded data, according to a preferred embodiment of the invention. According to the embodiment, the Mobilarm™ includes an on/off switch (15), a hanger support (7) with a rear camera (6) designed along outer horizontal ledge of the hanger support (7). The Mobilarm™ will be designed with a recessed area (8) along the rear surface (14) of the body to allow a user to securely fit the hanger (7) flush once retracted.

Figure 4:
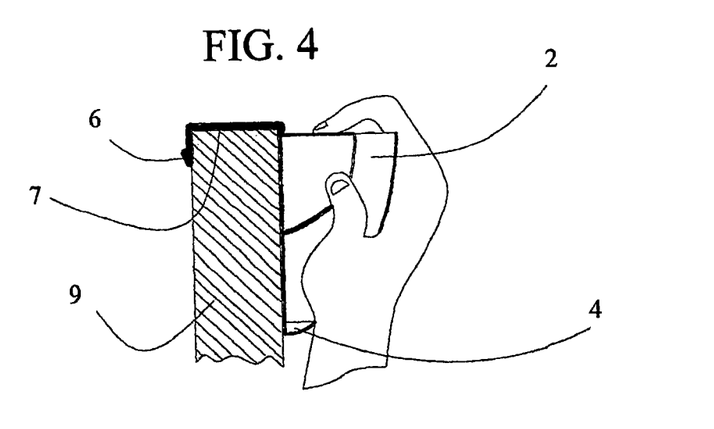
FIG. 4 is a perspective side-view of the portable device positioned on a standard door consistent with certain embodiments of the present invention.
Figure 5:
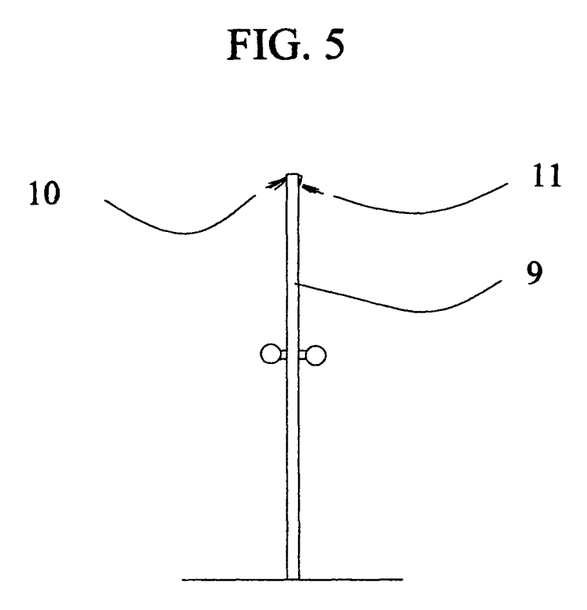
FIG. 5 is a perspective view of the portable device positioned on a standard door consistent with certain embodiments of the present invention.

FIG. 4 consists of various views of Mobilarm™ for conveniently transmitting recorded data, according to a preferred embodiment of the invention. According to the embodiment, the Mobilarm™ will include a hanger (7) with a rear camera (6) designed along outer horizontal ledge of the hanger (7) and a front camera (1) on the front surface of the Mobilarm™. The front camera (1) of Mobilarm™ will be designed to be visible along the front surface. The body (2) of the embodiment sits adjacent along the interior surface of a standard door (9).

FIG. 6 is a system diagram for an exemplary system configuration consistent with certain embodiments of the present invention. A system for interfacing with data on a user's mobile device (608) and transmitting such data to a first communication device (616). When the system is initiated via the software application (612), the data collecting computer (610) receives collected data through the cloud software server (614), containing the user's (604) stored data to the first communication device (616). The Mobilarm™ cloud software server (614) stores the transmitted information data received from the data collecting computer (610) containing all of the collected data, either automatically by the Mobilarm™ system or include another acceptable manner in the known art.

Figure 7:
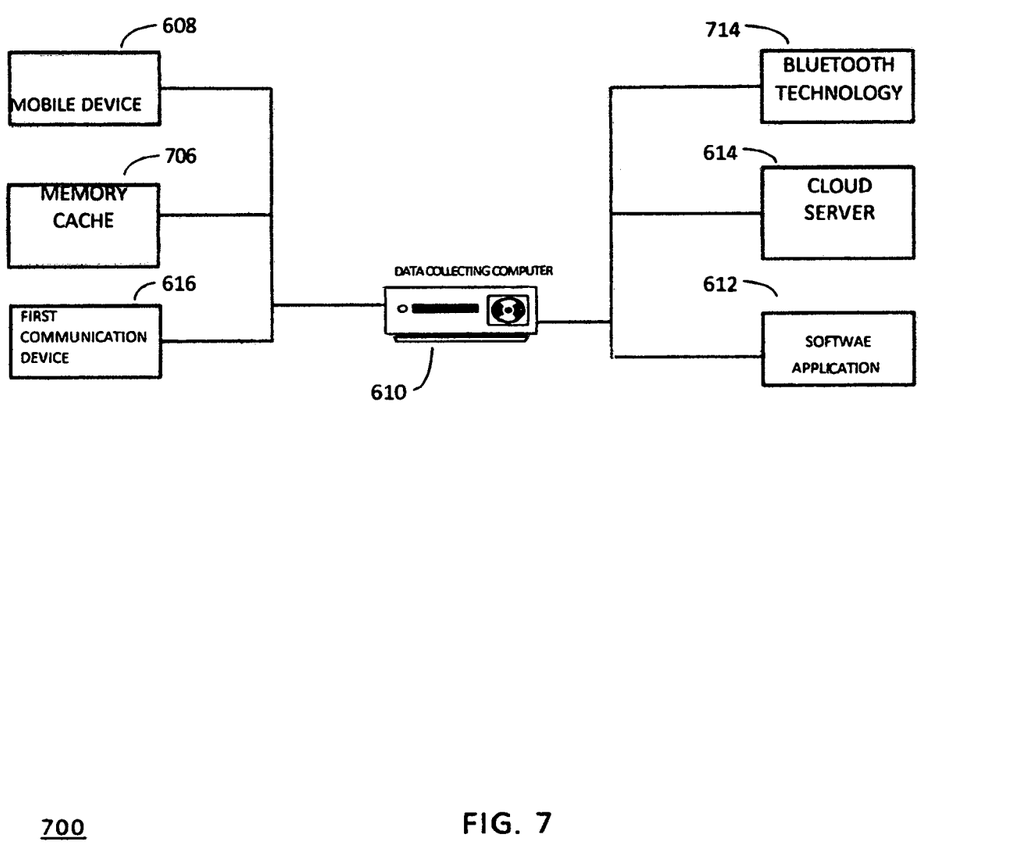
FIG. 7 is a system diagram for initiating a mobile application consistent with certain embodiments of the present invention.

FIG. 7 is a system diagram for an exemplary system configuration consistent with certain embodiments of the present invention. This figure presents a diagram for how a data collecting computer (610) will transmit and receive data between various components when the Mobilarm™ cache (706) which continuously collects data from the software application (612). The collected data is submitted to the memory cache (706) and is maintained by a cloud server (614). The mobile device (608) is in contact with a first communicating device (616) in a method of providing an enhanced experience for the overall communication system. Each mobile device (608) may have multiple software applications (612) installed on the mobile device (608) based upon a user's (604) preference. The installed software application (612) to each mobile device (608) is connected to the data collecting computer (610).

Figure 8:
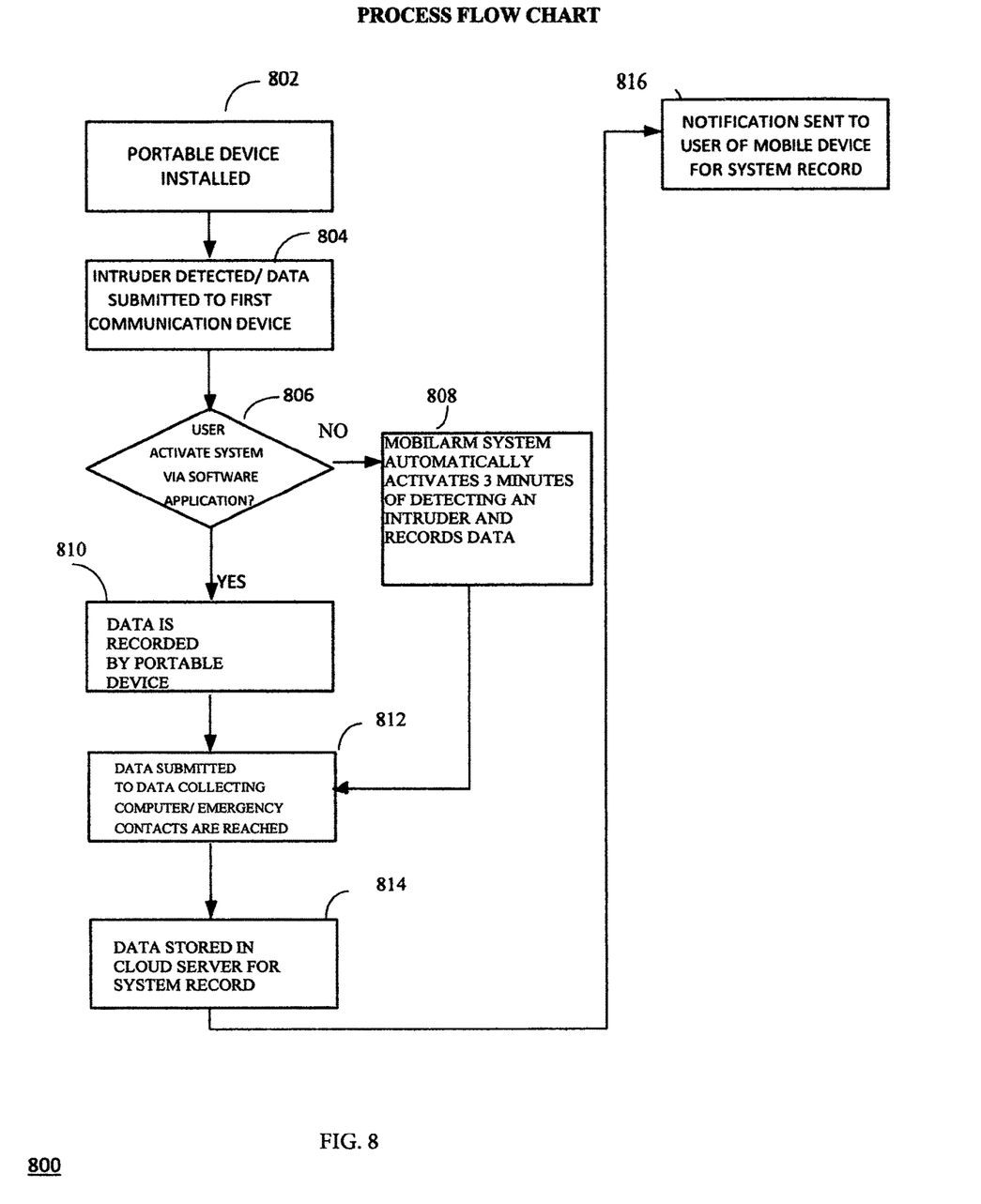
FIG. 8 is a process flow consistent with certain embodiments of the present invention.

Turning to FIG. 8, this figure presents a process flow consistent with certain embodiments of the present invention.

At 802, the portable device is installed and placed in "on" mode.

At 804, once an intruder is detected by the portable device, data is submitted to a first communication device.

At 806, the portable device may be activated via software application by the user.

At 808, if the portable device is not activated by the user, the Mobilarm™ application will automatically activate, start recording data within 3 minutes of detecting an intruder, and submit data to emergency contacts.

At 810, when the user activates the Mobilarm™ software application, the collected data will be recorded.

At 812, all recorded data will be submitted to emergency contacts for the purpose of rendering protective assistance.

At 814, in an embodiment, the Mobilarm™ application will communicate with a data collecting computer and cloud server to store data for such purposes as creating reports.

At 816, Mobilarm™ application will submit notifications to the user of a mobile device for system records.

The skilled person will be aware of a range of possible modifications of the various embodiments described above. Accordingly, the present invention is defined by the claims and their equivalents.

While certain illustrative embodiments have been described, it is evident that many alternatives, modifications, permutations and variations will become apparent to those skilled in the art in-light of the foregoing description.

What is claimed is:

1. A portable device for monitoring a designated area and alerting emergency contacts, comprising:
   a body, a front camera, a microphone, a rear camera, a sensor, a hanger comprising an outer horizontal ledge, on/off switch, charging port, a recessed area, and a detachable charger, wherein the rear camera is located at the outer horizontal ledge, wherein the recessed area is located along a rear surface of the body to allow a user to securely fit the hanger in the recessed area when the hanger is retracted, and wherein the hanger is extended outward to attach with an external object located at a distance from the user.

2. The portable device of claim 1 wherein said body has a left-side surface, right-side surface, front surface, and rear surface.

3. The portable device of claim 1 wherein said front camera is positioned along g front surface of said body.

4. The portable device of claim 1 wherein said hanger is positioned along the rear surface of said body.

5. The portable device of claim 1 wherein said hanger further includes at least one hinge that is rotatably attached to said body.

6. The portable device of claim 1 wherein said rear camera is positioned along an outer edge of said hanger.

7. The portable device of claim 1 wherein said sensor is positioned along a front surface of said body.

8. The portable device of claim 1 wherein said charger port is positioned along a side surface of said body.

* * * * *